Aug. 22, 1944.  A. E. BINGHAM  2,356,563
DAMPING VALVE FOR RESILIENT SUSPENSION DEVICES
Filed Nov. 1, 1941   2 Sheets-Sheet 1
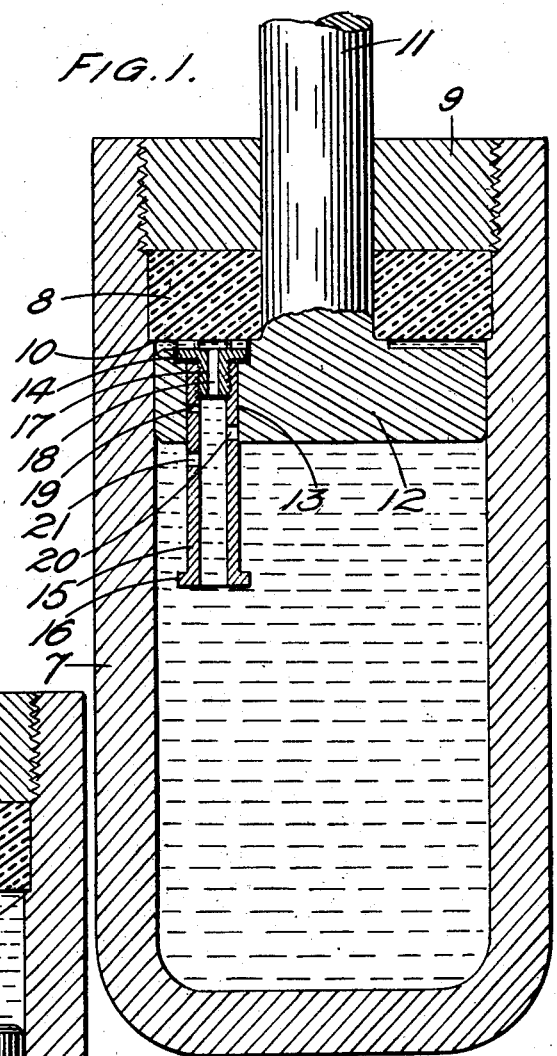
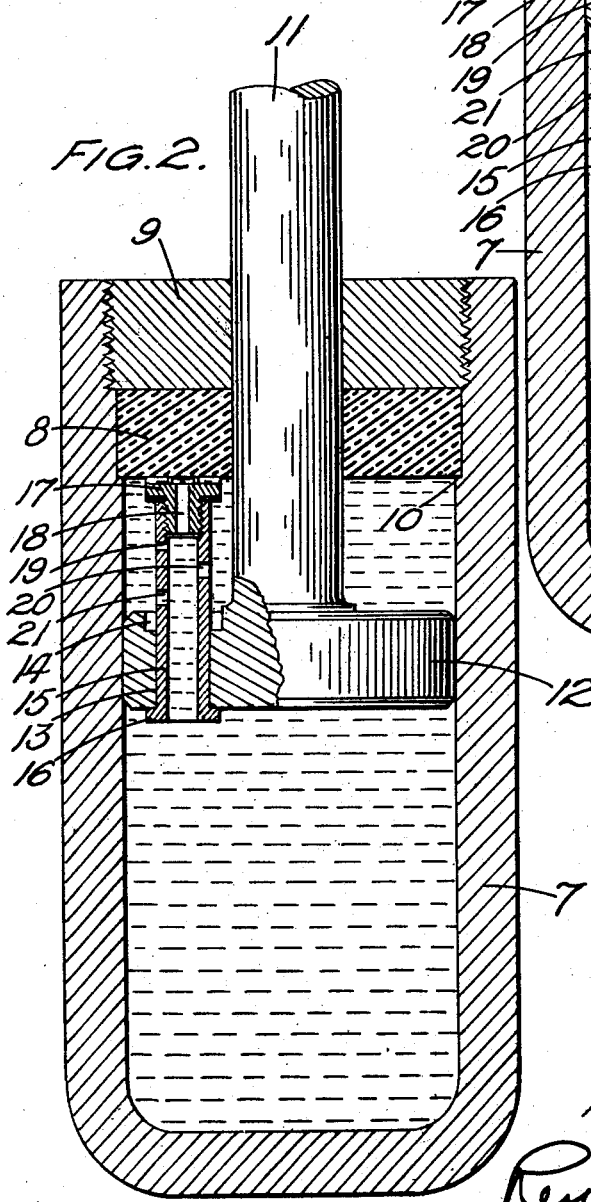
Inventor,
Arthur Edward Bingham
By
Reynolds + Beach
Atty.

Aug. 22, 1944. A. E. BINGHAM 2,356,563
DAMPING VALVE FOR RESILIENT SUSPENSION DEVICES
Filed Nov. 1, 1941  2 Sheets-Sheet 2
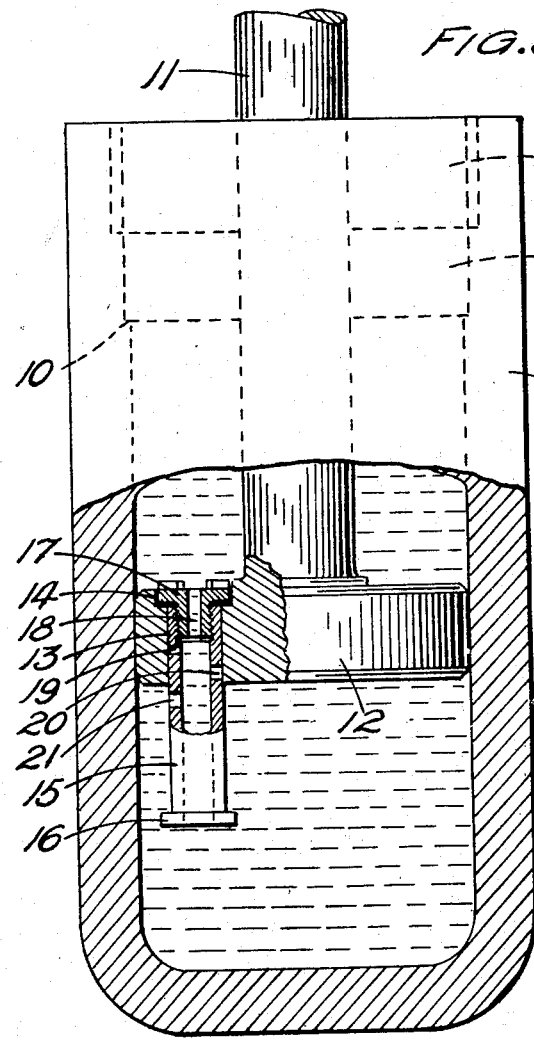
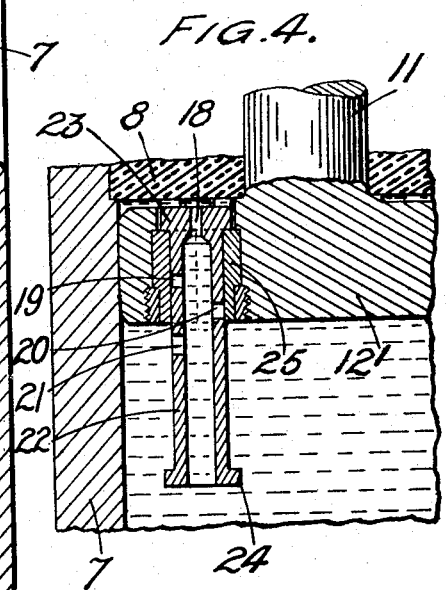
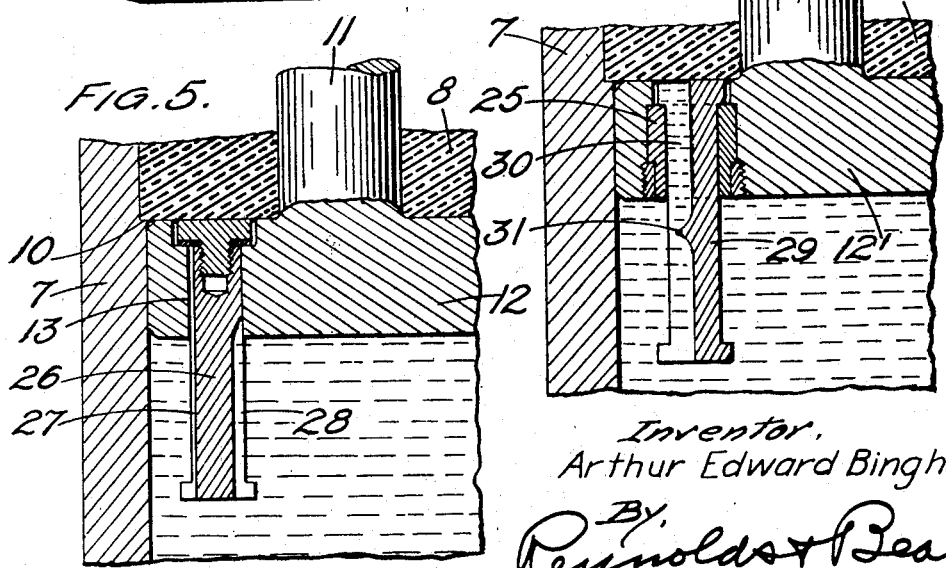
Inventor,
Arthur Edward Bingham
By Reynolds & Beach
Attly.

Patented Aug. 22, 1944

2,356,563

UNITED STATES PATENT OFFICE 2,356,563

DAMPING VALVE FOR RESILIENT SUSPENSION DEVICES

Arthur Edward Bingham, Cheltenham, England, assignor to Dowty Equipment Limited, Cheltenham, England Application November 1, 1941, Serial No. 417,430
In Great Britain December 30, 1940

13 Claims. (Cl. 267—64)

This invention is a resilient device embodying a cylinder with a plunger slidable with respect thereto, the plunger entering the cylinder against the resilient resistance of a liquid which completely fills the maximum available space within the cylinder, plunger movement being damped by means of a damping valve operating with effect varying progressively over at least some part of plunger stroke.

By the statement that liquid fills the maximum available space is meant that the entire space encompassed by unyielding walls is filled with liquid; there is no air space, however small, within or communicating directly or indirectly with the liquid-filled space, and capable of absorbing any compressive force by transmission from the liquid to a gas. The liquid itself is actually compressed by the compressive forces produced by movement of the plunger into the liquid-filled space.

It is to be understood that "progressive variation" is intended to imply that the damping effect increases or lessens throughout the range over which it occurs. The variation may be continuous, or it may take place in successive stages, and it may occur differently in one sense of plunger travel from that in which it is effected in the reverse sense of plunger travel.

The damping valve may itself constitute the flow resistance passage, or the passage may be defined partly by the valve and partly by the part immediately surrounding the valve with respect to which it slides.

The damping valve whilst sliding with respect to the plunger head may be carried by the head, or may remain stationary in the chamber to extend throughout the full length thereof, and whilst the movement of the damping valve may be restricted by contact with either end of the cylinder, its movement is primarily effected by variation of the pressure relationship between the chambers at opposite sides of the plunger head.

In some cases there may be a plurality of damping valves.

The invention has a particular application to resilient devices in which the compressible medium is constituted by liquid entrapped in the chamber and filling the maximum available space thereof. It is, however, conceivable that the invention may find useful application where other resiliently compressible and flowable mediums are employed.

It is an object of the present invention to provide a simple and effective construction of resilient device in which plunger movement is effectively damped, in at least one sense, and wherein the damping effect varies progressively over at least some part of the plunger stroke.

It is a further object of the invention to provide a liquid-filled resilient device wherein damping effect is achieved on a differential basis—that is to say, in which the damping effect under yield of the plunger with respect to the cylinder is different from the damping effect which prevails during rebound.

Yet another object of the invention is to provide a damping arrangement for such a resilient device in which during plunger movement in one direction a progressive variation of damping effect is afforded over at least a part of plunger stroke, whereas in the other direction of travel a constant damping effect is achieved over the whole or practically the whole of the stroke.

It is a further object of the present invention to provide a resilient device embodying the features of the present invention and which in use will achieve the objects thereof whilst utilising as the resilient medium liquid entrapped between the plunger and the interior of the cylinder to vary the compression of the liquid in accordance with plunger travel.

The invention will now be described with reference to the accompanying diagrammatic drawings, of which:

Figure 1 is a fragmentary view in section showing the cylinder of a telescopic shock-absorber and a part of the plunger, together with the associated damping means, the plunger being shown in the fully extended or no-load condition;

Figure 2 corresponds to Figure 1 but shows the plunger moved into the cylinder under axial load, the damping valve in this case having, due to plunger movement, taken up a setting which affords the maximum orifice area;

Figure 3 corresponds to Figures 1 and 2 but shows the damping valve in the position which it occupies during rebound or reextension of the shock-absorber, when the axial compressive load is relieved from the plunger;

Figure 4 shows an alternative form of damping valve and an alternative method of locating it in the damping head;

Figure 5 shows a further alternative form of damping valve; and

Figure 6 shows yet another alternative form of damping valve.

Before proceeding with the general description of the invention it should first be made clear that resilience is afforded by the compression of liquid. It therefore follows that in use the device is highly loadable in compression, and consequently it is desirable that operating loads should be applied purely axially in order to avoid the application of bending loads to the plunger. Thus, the plunger and cylinder are either rigidly mounted and so adapted and arranged in the structure as to be subject only to axial load, or, alternatively, the plunger and cylinder are in known manner each provided with a pin-joint for pivotal connection to the members of the structure between which the device operates. It also follows, by the inherent characteristics of such liquid-springing devices, that the viscosity of the liquid increases as the liquid is compressed; therefore increasing freedom of compressive movement of the liquid from one side of the plunger head to the other is essential to avoid unduly abrupt resistance, and to enable the shock loads to be largely absorbed by the compression of the liquid. Maximum portage must be available for flow restriction at the higher viscosities, while, conversely, on return stroke or rebound maximum damping is required, particularly as the decreasing viscosity, per se, would tend to increase the rapidity of flow.

Referring now to Figures 1, 2 and 3 of the drawings, the resilient device comprises a cylinder 7 provided at its mouth with a pressure-tight packing 8 secured in position by means of a closure plug 9 with the inner face of the packing bearing against the step 10 of the cylinder 7. The plunger 11 is slidable through the packing 8 and closure plug 9. At its inner end the plunger 11 carries the damping head 12. This head 12 is not, properly speaking, for the purpose of compressing the liquid which fills the cylinder; that function is performed solely by the plunger 11 as it moves into the cylinder and occupies some of the space previously available for liquid, thereby compressing it. Rather, the head 12 is a partition separating one part of the liquid from another part, and through the valve to be described, principally controls rebound upwardly, by control of communication and movement of liquid from the lower to the upper side of the head, upon release of the load. To a lesser degree the head, with its valve, controls the rate of compressive movement, but it does not, of itself, nor by its movement, produce any compression. From side to side of the damping head 12 there extends a bore which is comprised of the drilling 13 with the enlargement 14 at the upper end thereof. Slidable in the bore is a tubular valve element 15 constituting a damping valve. At its lower end the damping valve 15 has a stop flange 16, and during assembly the valve is inserted into the bore, whereafter the detachable flanged head 17 is received in the other end of the damping valve and secured in any convenient manner, as for example by a spring locking washer. The depth of the enlarged bore part 14 is such as to accommodate the detachable flanged head 17 without the latter projecting beyond the mouth of the bore part 14 when the damping head is in the position shown in Figure 1. The diameter of the head 17 is just slightly less than that of the recess 14, so that the resultant dashpot action, particularly but not solely in liquid-springing devices, avoids severe hammering. The head 17 is provided with a jet-like orifice 18, and it will be realised that the head 17 and projecting flange 16 prevent the tubular valve element from being entirely displaced from the bore through the damping head. The maximum available space within the cylinder with the plunger fully extended in relation to the cylinder is filled with liquid. Supplementary damping ports, such as those indicated at 19, 20, 21, are provided at spaced intervals through the wall of the tubular valve element 14. The orifice 18 may be in the damping head itself and the valve head 17 may be left solid without affecting the operation of the device.

When the device is subjected to compressive axial load the plunger 11 moves axially inwards relative to the cylinder 7, with the result that the liquid in the cylinder is compressed by the inwardly moving plunger 11. The compression is resiliently resisted by the liquid, and the device thus provides an effective resilient unit. As the head 12 moves downwardly under load, liquid which had been below the head flows upwardly through and past the valve to the space above the head. Upon reversal of the head's sense of movement, the liquid above the head must return to the space below the head. In either case there is afforded opportunity for damping control, but the head is not to be considered as a piston, for it does not contribute to compression; it merely partitions the chamber into spaces which mutually and inversely vary in size.

The ports 19, 20 and 21 through the wall of valve 15 between its outer surface and its bore, which are spaced axially of the valve, provide for variation of the restricted passage through the damping head 12. The desirability for the variation arises mainly due to the fact that the viscosity of the entrapped liquid may vary considerably with the compression. Thus, if it be assumed that the resilient device is unloaded, the plunger and damping valve are in the position shown in Figure 1, and a considerable part of the tubular valve element 15 is thus left projecting into the liquid enclosed within the cylinder. The orifice 18 provides restricted passage for liquid, since the valve end is held slightly spaced from the cylinder end by spacing pins on such valve end, and inward movement of the plunger 11 is thus initially damped. Due to the restricted liquid passage, the damping valve 15 remains stationary and damping is therefore provided solely by the restricted passage of liquid through the orifice 18 until such time as the damping head 12 uncovers the port 19 to permit supplementary flow therethrough. The remaining ports 20 and 21 are uncovered in succession to increase the damping orifice area progressively, as the liquid's viscosity increases, and the damping valve continues to remain stationary relative to the cylinder 7 during the compression stroke until such time as the plunger reaches the position shown in Figure 2. Should there be further inward movement of the plunger, the valve would move with the head 12.

Conversely, when the compressive load operating axially of the resilient device is relieved the entrapped liquid, being under compression, forces the plunger 11 outwardly with respect to the cylinder. Again, due to the restricted passage for liquid, the damping valve 15 moves from the position in which it is shown in Figure 2 to the position in which it is shown in Figure 3, with the result that during the slight plunger travel required to accomplish such valve movement virtually no liquid is transferred from one side of the plunger to the other and by such movement liquid flow through the ports 21, 20 and 19 is successively cut off in that order until in a short period of time and travel only the restricted liquid flow passage provided by the damping orifice 18 remains available.

It should be particularly noted that whereas the available orifice area is progressively increased on the compression stroke, the effect in rebound is that the orifice area is immediately reduced to the minimum, and consequently the damping effect in rebound, notwithstanding the decreasing viscosity of the liquid, is greater than that operating against inward movement of the pluunger. Such an arrangement is particularly desirable in the apparatus described in order to prevent undue violence of rebound.

The arrangement of damping valve shown in Figure 4 differs from that of Figures 1, 2 and 3, in that in this case the damping valve 22 is integrally provided with top and bottom stop flanges 23 and 24. The provision of a separate head, such as that indicated by the reference numeral 17 in Figure 1, is thus avoided, but the valve 22 is otherwise the same as the damping valve 15. It is, however, necessary to vary the manner of securing the valve, and thus the damping head 12' receives the split bearing sleeve 25, which embraces the valve 22 between the stop flanges 23 and 24, thus serving to limit axial movement of the damping valve, the split bearing sleeve 25 being itself secured in the damping head in any convenient manner.

The modified form of damping valve shown in Figure 5 differs from the previously-described damping valve mainly in that it comprises a solid body part 26. The orifice area available for initial damping and for damping in rebound is provided by the small fluting 27. The supplementary orifice area is provided by the additional fluting 28, which may have the form of a tapering slot (tapering in depth and/or in width); or in some cases there may be a plurality of supplementary slots of various different lengths. The solid damping valve body 26 may have a separate head portion, as shown and described with reference to the damping valve of Figures 1, 2, and 3, or the head construction can be the same as that described with reference to Figure 4, in which event an arrangement similar in function to that described with reference to Figure 4 will be necessary to secure the valve in position.

The damping valve shown in Figure 6 is a modification of that shown in Figure 5 and serves to illustrate how the damping characteristics can be varied almost at will. As shown in Figure 6, the solid valve body 29 has a single parallel-walled fluting 30 cut throughout its length. The base of the fluting, however, is cut irregularly in this case, reducing the effective depth of the fluting, and therefore the available orifice area where the ridge 31 is provided intermediate the upper and lower ends of the fluting 30. Thus, the maximum damping occurs when the ridge 31 is within the bore running through the damping head. The damping effect resulting from the employment of a valve arrangement such as that shown in Figure 6 is such that in both directions of movement the initial damping effect is at the minimum, and gradually increases to the maximum at some point intermediate the operative limits of valve movement.

What I claim is:

1. A resilient device including a chamber completely filled with liquid, a plunger operating in said chamber to vary the compression of the liquid contained in said chamber, a damping head carried by the plunger and operating to partition said chamber, a damping valve slidably engaging through said damping head to define resistance passage means therethrough from one partition compartment of said chamber to the other; said flow resistance passage means including an orifice available for liquid flow both on the compression and the rebound stroke, and supplementary orifice means made available for progressively increasing liquid flow on the compression stroke as compression of the liquid increases its viscosity.

2. A resilient unit for insertion between two relatively movable members to afford resilient connection therebetween, including a closed chamber wherein the maximum available space is filled with liquid; a plunger movable under axial load into said chamber to achieve resilience by compression of such liquid; a damping head on the plunger partitioning the space within the chamber into two mutually and inversely variable spaces; and damping means arranged to cooperate with said head to afford resistance to flow of liquid from either such space to the other according to the direction of the damping head's movement, said damping means including a valve carried by said damping head, ported for flow of liquid therethrough from one side of said damping head to the other, and movable relative to the damping head to afford through said valve an opening of area varying progressively during movement of said damping head.

3. A resilient unit as in claim 2, in which the valve is ported to afford through it an opening of area increasing progressively by change of position relative to the damping head during movement of the damping head in a direction to compress the liquid in the chamber from the minimum toward the maximum.

4. A resilient unit as in claim 2, in which the valve has a through port communicating with the spaces on both sides of the damping head whatever its position and direction of movement, and which valve is ported for increasing the area of opening therethrough progressively by progressive movement of the valve relative to the damping head during movement of the damping head in a direction to compress the liquid in the chamber from the minimum toward the maximum.

5. A resilient unit as in claim 2, in which the damping head has a through passage, wherein the valve is slidably mounted, and the valve has a bore including a restricted port always open for communication between the chambers on opposite sides of the damping head under all operating conditions, and has a plurality of ports extending through its wall to afford communication between its exterior and its bore, which ports are located to be masked against such communication in the no-load condition, but are spaced longitudinally of the valve to be progressively unmasked as the valve slides relative to the head during movement of the head to increase compression of the liquid, thus to increase the area of opening through the valve for flow of liquid from the forward side of the damping head in the direction of its movement to its rearward side.

6. A resilient unit for insertion between two relatively movable members to afford resilient connection therebetween, comprising a closed chamber wherein the maximum available space is filled with liquid, a plunger movable under axial load into said chamber to achieve resilience by compression of such liquid, a damping head on the plunger partitioning the space within the chamber into two mutually and inversely variable spaces, and damping means operable to by-pass liquid from the forward side of said head in the direction of its movement to its rearward side through an opening the effective area of which is increased following substantial movement of said damping head in a direction to compress the liquid in the chamber.

7. A resilient unit for insertion between two relatively movable members to afford resilient connection therebetween, comprising a closed chamber wherein the maximum available space is filled with liquid, a plunger movable under axial load into said chamber to achieve resilience by compression of such liquid, a damping head on the plunger partitioning the space within the chamber into two mutually and inversely variable spaces, and damping means operable to by-pass liquid from the forward side of said head in the direction of its movement to its rearward side through a larger opening over the major portion of the movement of said damping head in a direction to compress the liquid in the chamber than during the initial portion of the movement in such direction and movement thereof in the opposite direction.

8. A resilient unit for insertion between two relatively movable members to afford resilient connection therebetween, including a closed chamber wherein the maximum available space is filled with liquid, a plunger movable under axial load into said chamber to achieve resilience by compression of such liquid, a damping head on the plunger partitioning the space within the chamber into two mutually and inversely variable spaces, and damping means arranged to cooperate with said head to afford resistance to flow of liquid from either such space to the other according to the direction of the damping head's movement, said damping means including a valve carried by said damping head in position for engagement with the chamber, ported for flow of liquid therethrough from one side of said damping head to the other, and movable relative to said damping head to afford through said valve an opening of area varying progressively during movement of said damping head relative to said valve and while said valve is thus engaged with the chamber.

9. A resilient unit for insertion between two relatively movable members to afford resilient connection therebetween, including a closed chamber filled with fluid, a plunger movable under axial load into said chamber to achieve resilience by compression of such fluid, a damping head on the plunger partitioning the space within the chamber into two mutually and inversely variable spaces, and damping means arranged to cooperate with said head to afford resistance to flow of fluid from either such space to the other according to the direction of movement of the damping head, such damping means including a valve carried by said damping head, having a channel extending lengthwise thereof for a distance greater than the thickness of said damping head for flow of fluid therethrough from one side of the head to the other, said valve being reciprocable through an aperture in said damping head to expose a greater or lesser length of said channel beyond one face of said damping head, such channel varying progressively in size lengthwise of the valve over the maximum portion thereof capable of being thus exposed, for varying the area of effective opening through the valve corresponding to the amount of projection of said valve beyond such face of the damping head.

10. A resilient unit for insertion between two relatively movable members to afford resilient connection therebetween, including a closed chamber filled with fluid, a plunger movable under axial load into said chamber to achieve resilience by compression of such fluid, a damping head on the plunger partitioning the space within the chamber into two mutually and inversely variable spaces, and damping means arranged to cooperate with said head to afford resistance to flow of fluid from either such space to the other according to the direction of movement of the damping head said damping means including a valve carried by said damping head, having a longer channel and a shorter channel extending lengthwise thereof for a distance greater than the thickness of said damping head for flow of fluid therethrough from one side of the head to the other, said valve being reciprocable through an aperture in said damping head movable in one direction to mask said shorter channel for flow of fluid only through the longer channel, and movable in the opposite direction relative to said damping head to expose said shorter channel for flow of fluid through both of such channels.

11. A resilient unit for insertion between two relatively movable members to afford resilient connection therebetween, including a closed chamber filled with fluid, a plunger movable under axial load into said chamber to achieve resilience by compression of such fluid, a damping head on the plunger partitioning the space within the chamber into two mutually and inversely variable spaces, and damping means arranged to cooperate with said head to afford resistance to flow of fluid from either such space to the other according to the direction of movement of the damping head, such damping means including a valve carried by said damping head, having a channel extending lengthwise thereof for flow of fluid therethrough from one side of the head to the other, which channel has a restricted portion spaced from one end of the channel a distance greater than the thickness of said damping head, said valve being reciprocable through an aperture in said damping head between a position in which an end of said channel is disposed at one side of the head and the restriction is disposed at the other side of the head for flow of fluid between the spaces on opposite sides thereof, and a position in which the restriction in the channel lies intermediately between the faces of the head to restrict flow of fluid through the valve.

12. A resilient unit as defined in claim 11, in which the restriction in the channel is spaced from both ends thereof by a distance greater than the thickness of the damping head.

13. A resilient device including a chamber completely filled with liquid, a plunger operating in said chamber to vary the compression of the liquid contained in said chamber, a damping head carried by said plunger and operating to partition said chamber, a damping valve slidably engaging through said damping head to define resistance passage means therethrough from one partitioned compartment of said chamber to the other, said damping valve including an orifice available for liquid flow both on the compression stroke and on the rebound stroke, and a plurality of ports spaced axially of the valve for variably masking by said head over at least a portion of said plunger stroke in accordance with relative movement induced between said valve and said head by displacement of liquid through the valve consequent upon plunger movement.

ARTHUR EDWARD BINGHAM.